United States Patent [19]

Van Rhyn et al.

[11] Patent Number: 5,138,128
[45] Date of Patent: Aug. 11, 1992

[54] FRONT END FIXTURE AND METHOD FOR STUD WELDING GUN

[75] Inventors: Lucas H. Van Rhyn, Dansville; H. Paul Inscho, Wayland, both of N.Y.

[73] Assignee: Foster Wheeler Energy Corporation, Clinton, N.J.

[21] Appl. No.: 647,434

[22] Filed: Jan. 29, 1991

[51] Int. Cl.⁵ ............................................. B23K 9/20
[52] U.S. Cl. ........................................ 219/99; 219/98
[58] Field of Search .................................. 219/98, 99

[56] References Cited

U.S. PATENT DOCUMENTS

| | | | |
|---|---|---|---|
| 2,718,578 | 9/1955 | Ruebel et al. | 219/98 |
| 2,718,579 | 9/1955 | Kennedy | 219/98 |
| 2,867,714 | 1/1955 | MacLachlan | 219/98 |
| 4,241,287 | 12/1980 | Sjöholm . | |

OTHER PUBLICATIONS

Two photocopied sheets bearing the labels Connection Instructions-Steel; Gun Set-Up Welding Steel Studs; and Lift and Lift Adjustment.

*Primary Examiner*—Clifford C. Shaw
*Attorney, Agent, or Firm*—Marvin A. Naigur

[57] ABSTRACT

Method and front-end fixture adapted for use with manually-operated electric stud welding guns, which permits the successful welding of a plurality of metal studs uniformly onto a workpiece. Various aspects of the invention provide for repeated accurate spacing of the studs as they are successively welded, for accurate alignment of a series of studs, and for each stud to be oriented in a disposition substantially perpendicular to the surface of the work piece. The preferred embodiments include a bracket mounted to a conventional welding gun, an alignment bushing mounted on the bracket forward of the chuck of the gun for contacting a previously-welded stud, and a footpiece mounted on the bracket rearward of the chuck.

12 Claims, 4 Drawing Sheets

FRONT END FIXTURE AND METHOD FOR STUD WELDING GUN

BACKGROUND OF THE INVENTION

This invention pertains to electric welding of studs onto a workpiece and, in particular, to a fixture adapted for attachment onto the front end of an electric manually-operated stud welding gun to facilitate the welding of studs onto a workpiece.

It is known to use a manually-operated stud welding gun to weld individual studs onto the outer surface of a workpiece such as a length of boiler tubing. However, the use of such conventional guns has resulted in certain problems, including irregular spacing of the studs, lack of accurate alignment of a plurality of studs that should be aligned, and studs that are not disposed perpendicular to the workpiece.

The prior art has provided various welding apparatus. The above-mentioned manual guns have at times been supplied with a castellated ferrule surrounding a stud to be welded, as an aid in obtaining perpendicular orientation. Also known is apparatus for welding fins to a tube interior, as disclosed in U.S. Pat. No. 4,241,287 of Sjoholm. However, the prior art appears not to have provided an adequate device or method for manually and conveniently welding a plurality of spaced studs onto a workpiece in an accurate and consistent manner. Such deficiencies have been overcome by the present invention.

SUMMARY OF THE INVENTION

The current invention provides a method and front-end fixture adapted for use with manually-operated electric stud welding guns, which fixture permits the successful welding of a plurality of metal studs uniformly onto a workpiece. Various aspects of the invention provide for repeated accurate spacing of the studs as they are successively welded, for accurate alignment of a series of studs, and for each stud to be oriented in a disposition substantially perpendicular to the surface of the workpiece.

The invention includes means for attaching a bracket to a conventional welding gun in such a way that the axis of the chuck of the gun is at a predetermined location with respect to the bracket. Spaced from that location and fixed on the bracket is a means for contacting a previously-welded stud. The spacing is such that, when a stud disposed in the chuck is welded to the workpiece during said contact with the previously-welded stud, the spacing between the previously-welded stud and the newly-welded stud is pre-determined.

According to another aspect of the invention, the stud contacting means may be provided with an opening that conforms to the diameter of the studs being welded. When a cylindrical previously-welded stud is received in a cylindrical opening, the nature of the contact is such that the previously-welded stud will guide the apparatus so as to establish a parallel relationship between the previously-welded stud and the stud-to-be-welded. If the previous stud is perpendicular to the workpiece, the new stud also will be perpendicular.

According to an additional aspect of the invention, the invention comprises means disposed on the bracket for contacting the workpiece to support the bracket a predetermined distance above the workpiece. Desirably, workpiece contacting means are provided both forward and rearward of the chuck. In the disclosed embodiments, the workpiece contacting means are capable of performing plural functions, including helping to establish perpendicularity between the studs and the workpiece, helping to establish a proper plunge distance as the stud is being welded, and helping to achieve alignment of a plurality of studs.

BRIEF DESCRIPTION OF THE DRAWINGS

The above brief description as well as further objects, features and advantages of the present invention will be more fully appreciated by reference to the following detailed description of presently preferred but nonetheless illustrative embodiments in accord with the present invention when taken in conjunction with the accompanying drawings wherein.

DETAILED DESCRIPTION OF THE PREFERRED EMBODIMENTS

Figure 1:
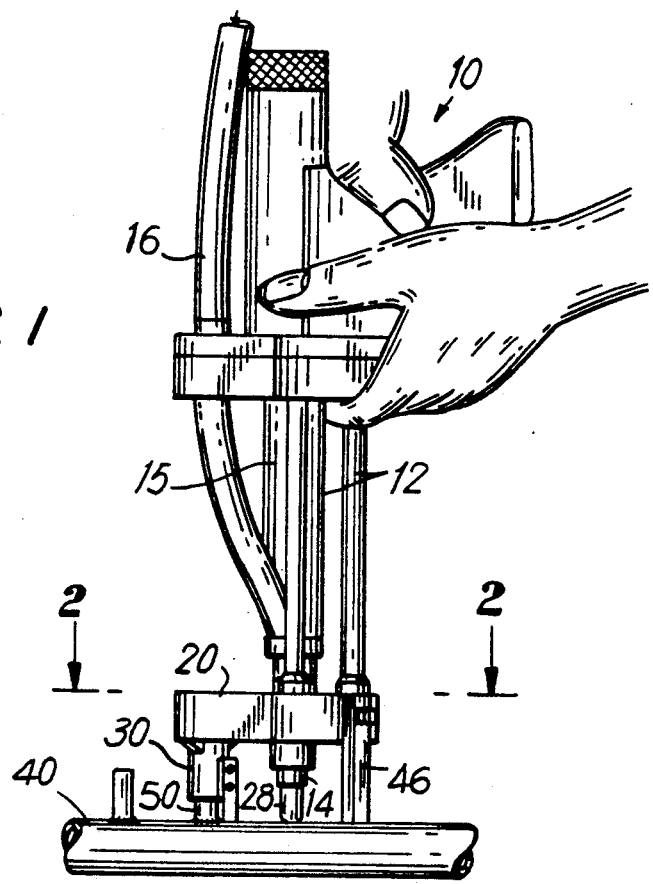
FIG. 1 is an elevation view taken partly from the front and partly from the end of a first embodiment of the invention attached to a conventional stud welding gun, and being used to weld a stud to a length of boiler tubing.

A first embodiment of the invention will be described with respect to FIGS. 1—3.

A hand-held electric stud welding gun 10 has conventional support legs 12 having lengths that may be adjusted at the body of the gun to account for the lengths of the studs to be welded to a pipe or the like. Studs may be supplied to the chuck 14 along pneumatic tube 16. Chuck 14 is supported and driven by breech 15, in a known manner. In the alternative, the studs may be manually inserted into the chuck 14.

The conventional foot piece of the welding gun 10 has been replaced by a support bracket 20 made of phenolic or other electrically non-conductive material. Support bracket 20 is fixed on the legs 12 and has a chuck-receiving opening 22 for receiving the chuck 14 of the gun. The chuck 14 is slidingly received in electrically-insulating support bushing 24, which may extend below the lower surface 26 of the bracket 20 for providing improved lateral stability of the chuck and a stud-to-be-welded 28.

Forward of the chuck location a distance "A" corresponding to one stud spacing is steel alignment bushing 30, having formed therein a cylindrical opening 32 conforming to the diameters of the studs being welded. Stop 34, which desirably may be fixed on the alignment bushing 30, as by screws 36 or the like, desirably tapers to a lower edge 38. Stop 34 contacts the workpiece 40 and supports the forward portion of the bracket 20 a repeatable distance above the workpiece. The distance "A" may correspond to one or more integral values of desired stud spacing. It is presently preferred for the correspondence to be one-to-one in order to provide a smaller fixture that may be used in tighter spots where stud welding might be desired.

Both the support bushing 24 and the alignment bushing 30 are mounted in the bracket 20 by brass inserts 42,44 respectively, which may be press-fit into the bracket. Desirably, insert 42 may be slotted longitudinally to provide collet-like retention of the support bushing 24.

Disposed rearward of the chuck location a distance "B" is a footpiece 46 that serves to contact the workpiece 40 to support the rearward portion of the support bracket 20 a repeatable distance above the workpiece. The distance "B" is not critical. As a general rule, increasing distance "B" provides for improved performance but makes a larger fixture that is more unwieldy and that will fit into fewer spaces where stud welding might be desired. Also, the dimension of "B" may change from gun to gun, depending on the distance between the chuck and the support legs of the particular gun being used.

Figure 2:
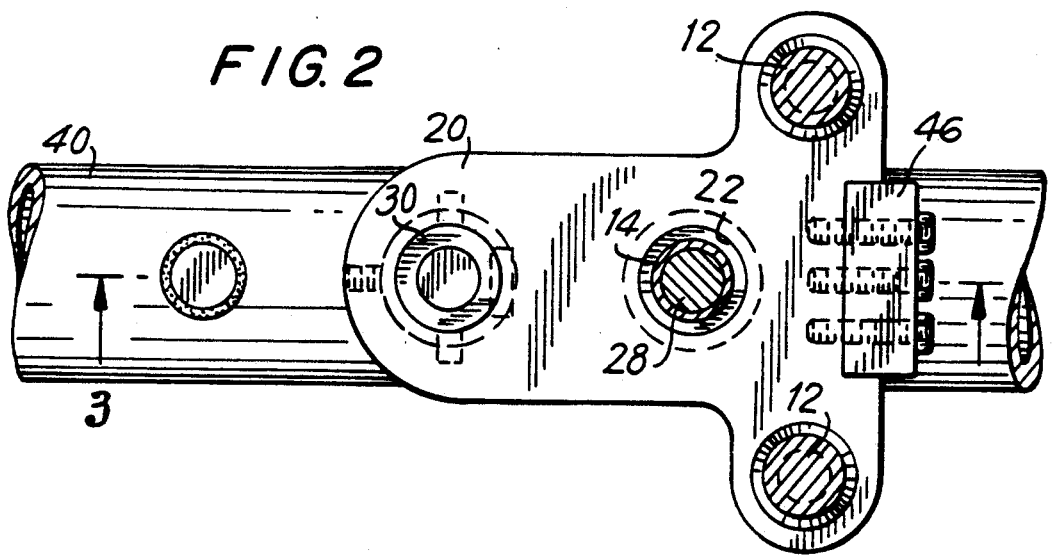
FIG. 2 is a plan view taken along line 2—2 of FIG. 1.

For added stability, the footpiece 46 is recessed into a notch formed in the bracket 20, as best seen in FIG. 2. The footpiece 46 serves other functions, as will be described.

Figure 3:
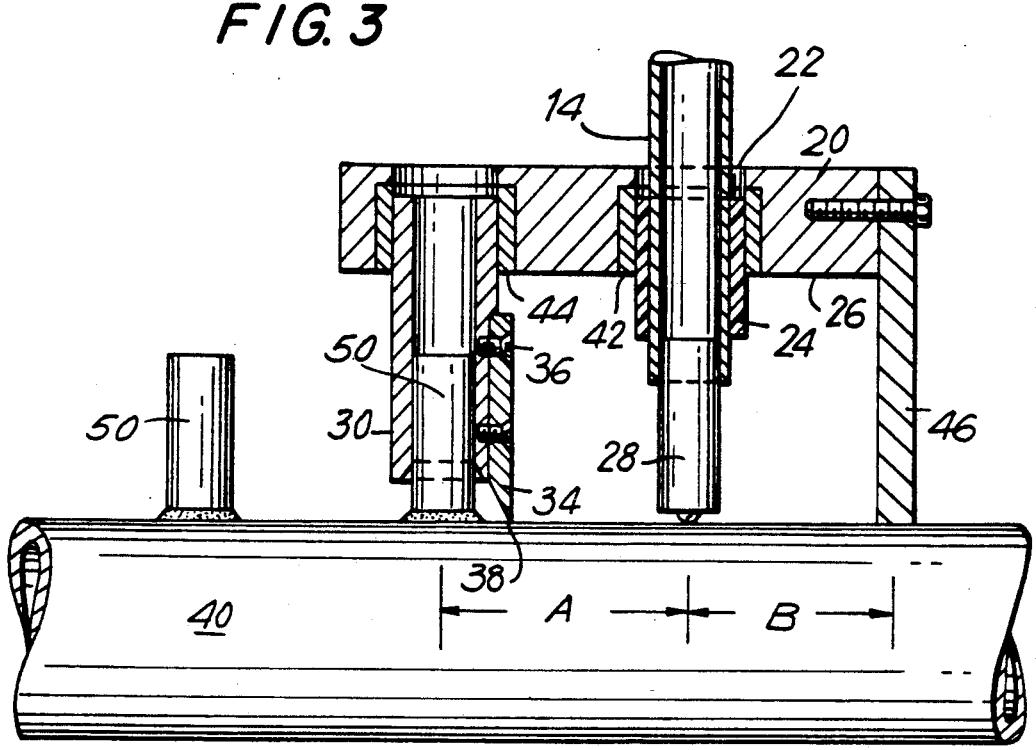
FIG. 3 is an elevation view, partly in section, taken along line 3—3 of FIG. 2.

In operation, the alignment bushing 30 is slipped over a previously-welded stud 50, and a stud-to-be-welded 28 is positioned in the chuck 14, as shown in FIGS. 1 and 3. The footpiece 46 in cooperation with the stop 34 helps to maintain front-to-rear vertical orientation of the stud-to-be-welded 28. The conforming opening of the alignment bushing 30 helps in establishing both front-to-rear vertical orientation of the stud 28 and also side-to-side vertical orientation.

Finally, linear alignment of a plurality of studs may be maintained during welding by an operator sighting along the footpiece 46, the stud 28, and the stop 34 or alignment bushing 30 and workpiece 40. To facilitate this practice, the operator may place a longitudinal chalk mark along the workpiece 40 before beginning the welding operation.

Figure 4:
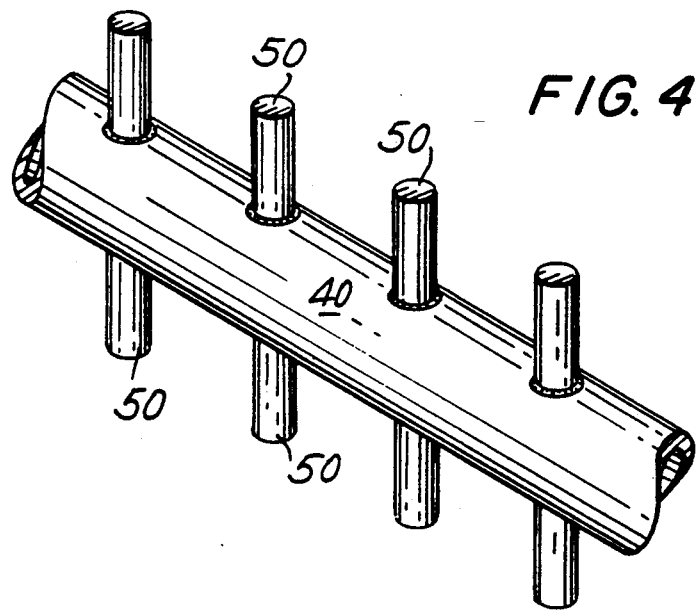
FIG. 4 is a perspective view of a length of boiler tubing having a plurality of uniformly-spaced studs welded onto the tube by using a fixture according to the current invention.

FIG. 4 illustrates the uniform result that may be achieved using apparatus and method according to the current invention.

Figure 5:
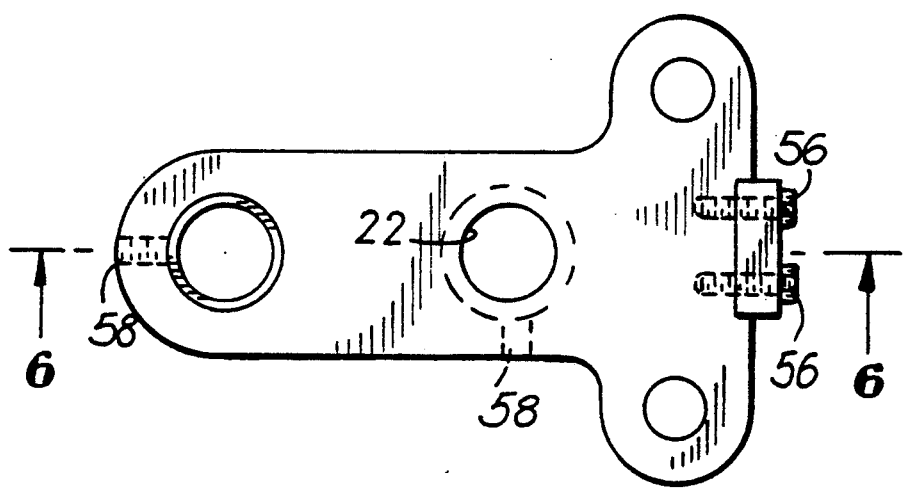
FIG. 5 is a plan view of a second embodiment of a fixture according to the current invention.
Figure 6:
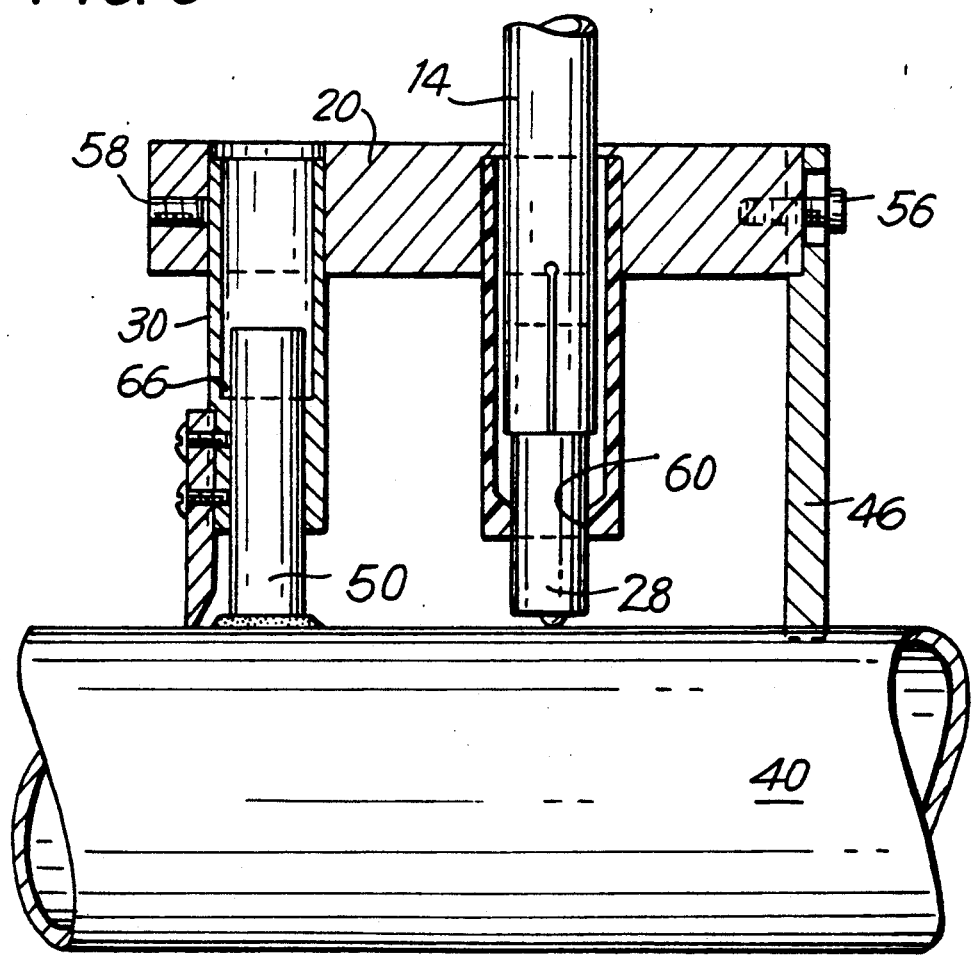
FIG. 6 is an elevation view similar to FIG. 3 but showing the second embodiment in use.
Figure 7:
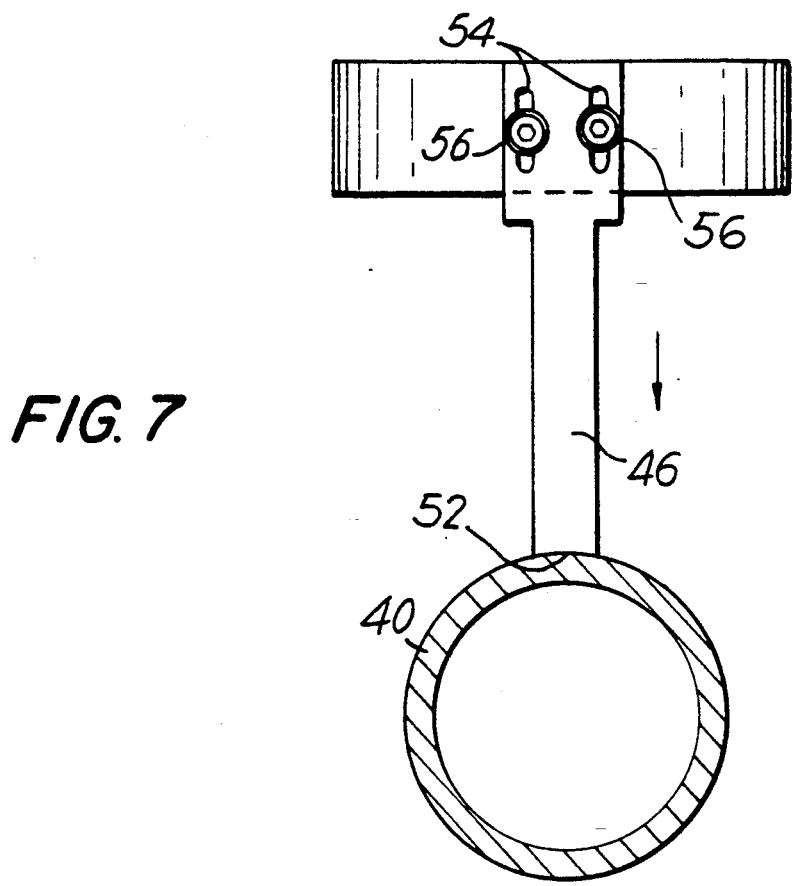
FIG. 7 is an end view of the second embodiment in use.

A second embodiment will now be described with reference to FIGS. 5-7. It will be understood that many of the differences between the two embodiments are independent and may be selectively incorporated in either embodiment.

Where the workpiece 40 has a curved surface as in the case of a pipe, the bottom of the footpiece 46 may advantageously also be similarly curved as shown at 52 (FIG. 7) in order to provide for enhanced lateral stability of the welding gun 10. The vertical position of the footpiece 46 may be adjustable with respect to the support bracket 20. For this purpose, the footpiece of the second embodiment has been provided with vertical slots 54 and tightening bolts 56.

The support bracket 20 of the second embodiment may be made of any sufficiently rigid non-conductive material. As shown in FIG. 6; the inserts 42,44 (FIG. 3) may be omitted and the bushing elements 24, 30 each held in place by set screws 58 (FIG. 6) Also, the stop 34 may be adjustably mounted to the forward portion of the alignment bushing 30, as shown in FIG. 6.

The length of the stud support bushing 24 may advantageously be increased so that its distal end supports the stud 28, as opposed to supporting the chuck 14, preferably at a location closer to the distal end of the stud 28 than to the proximal end of the stud. For this purpose, the distal end of the stud support bushing 24 may be provided with a narrowed opening 60 substantially conforming to the diameter of the stud 28 to be welded. Also if desired, the alignment bushing 30 may have an internal circular shoulder 66 provided near its lower end, so that the previously-welded stud 50 is not contacted over its entire length. The proximal end of the stud is still held in the chuck 14.

Figure 8:
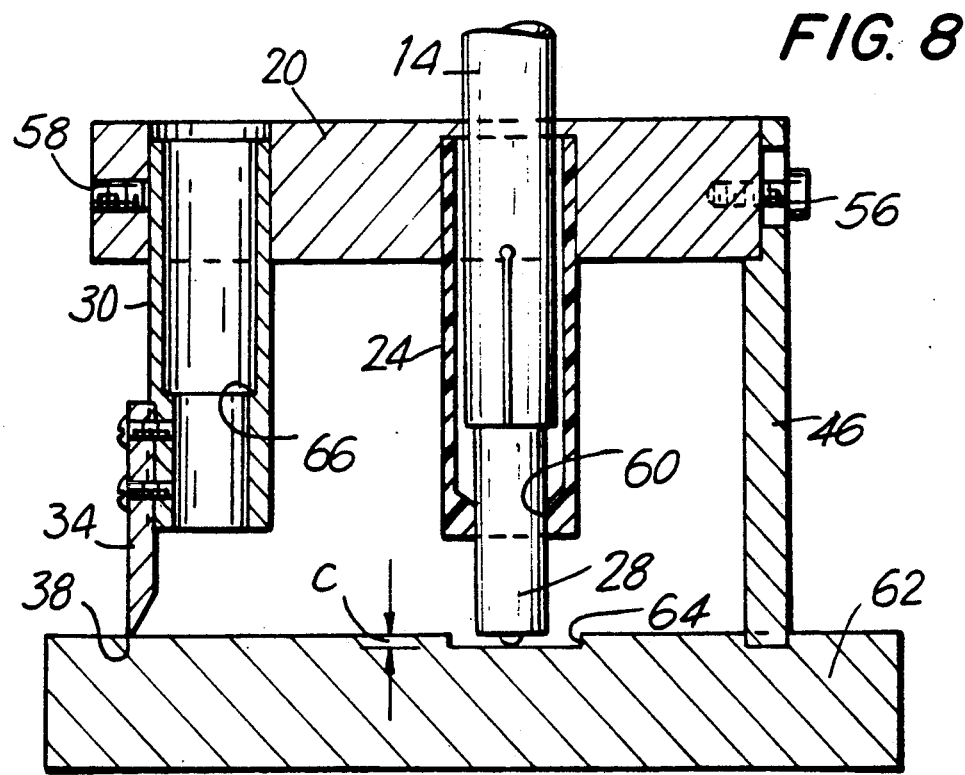
FIG. 8 is a view similar to FIG. 6 and showing the use of a gauge to adjust the amount of plunge.

During operation, proper positioning of the stud 28 in the chuck provides for proper plunge distance, as established by the welding gun mechanism. The current invention provides an improved method of adjusting plunge distance, an example of which will be described with reference to FIG. 8. There is shown a gauge 62 in the form of a bar having a notch 64 cut into its surface. The depth C of the notch corresponds with the desired amount of plunge, and typically may be about 0.090 inch. In order to pre-set the proper amount of plunge for the first and subsequent studs to be welded, the operator may place the gauge 62 across the edge 38 and footpiece 46 after the stud is inserted into the chuck but before the gun assembly is introduced to the workpiece 40. By adjusting the legs 12 to alter the distance between bracket 20 and the main body of the gun, the operator causes contact between the gauge 62 and the stud to be welded. Such contact establishes the proper amount of plunge. This procedure may be used with both manual and automatic feed stud welding guns.

Cooperation between the footpiece 46 and stop 34 maintains the desired vertical distance of the chuck 14 above the workpiece 40 prior to welding, and therefore provides that the stud-to-be-welded 28 will experience a proper plunge distance once the welding operation occurs.

EXAMPLE

A front end welding fixture is provided, including a support bracket adapted to be fixed on the legs of a conventional stud welding gun such as a TRW Nelson model NS-30 or ERICO model A58. The support bracket, made of grade G-10 glass epoxy. The footpiece and stop were made of tough brass having a Rockwell hardness of 25C. The alignment bushing was made of hardened steel drill rod (Rockwell hardness 50C) to reduce wear and maintain alignment accuracy. The stud support bushing was made of an electrically non-conductive resinous polymer (polytetrafluoroethylene).

A latitude of further modification, change and substitution is intended in the foregoing disclosure and in some instances some features of the invention will be employed without a corresponding use of other features. For example, the alignment bushing might take a different design or be replaced by some other means for contacting the previously-welded stud. The function of the stop might be performed by an element attached directly to some other element such as the support bracket. Accordingly, it is appropriate that the appended claims be construed broadly and in a manner consistent with the scope of the invention therein.

What is claimed is:

1. A front-end fixture for an electric hand-held stud welding gun of the type having a foot piece receiving a chuck of the gun and support means mounting the foot piece of the gun, the fixture being useful for welding studs to a workpiece at a predetermined stud spacing and comprising:

a foot piece in the form of a bracket having means adapted to mount the bracket on the gun and having formed therein a chuck receiving opening, the chuck receiving opening being disposed at a chuck location and being specially adapted to receive a chuck;

stud contacting means disposed on said bracket for contacting a previously-welded stud and for spacing the chuck from a previously-welded stud by a distance corresponding to a desired stud spacing, said stud contacting means being disposed in a forward direction with respect to the chuck and having an opening that accurately conforms to the diameter of the studs being welded;

workpiece contacting footpiece means disposed on said bracket in a rearward direction from the chuck location, and extending therefrom a distance sufficient to support a rear portion of the bracket above the workpiece; and workpiece contracting stop means disposed on said bracket in a forward direction from the chuck location and extending therefrom a distance sufficient to support a forward portion of the bracket above the workpiece.

2. The apparatus of claim 1, wherein the stud contacting means comprises means having a cylindrical opening for receiving a previously-welded stud about the circumference thereof.

3. The fixture apparatus of claim 1, comprising means for fixing the workpiece contacting footpiece means in a plurality of positions with respect to the bracket.

4. The fixture apparatus of claim 1, comprising a support bushing mounted in the chuck receiving opening and extending beyond a lower surface of the bracket to provide improved stability.

5. The fixture apparatus of claim 4, a lower end of the support bushing having formed therein an opening substantially corresponding to the diameter of a stud to be welded.

6. The apparatus of claim 1, wherein said workpiece contacting stop means is fixed onto said stud contacting means.

7. The fixture apparatus of claim 1, wherein said stud contacting means is an alignment bushing having a cylindrical opening conforming to the diameter of the studs.

8. A method of manually welding a stud to a workpiece at a predetermined disposition with respect to a previously-welded stud, the method comprising the steps of:

providing an electric hand-held stud welding gun having a chuck and stud contacting means fixed at a forward location with respect to the chuck;

providing workpiece contacting means fixed at a rearward position with respect to the chuck;

disposing a stud-to-bewelded in the chuck;

establishing a disposition of the stud-to-be-welded by contacting the previously-welded stud with the stud contacting means and the workpiece contacting means; and welding the stud-to-bewelded to the workpiece while maintaining the contact of the previously-welded stud and the stud contacting means.

9. The method of claim 8, wherein said step of establishing a disposition of the stud-to-be-welded comprises the step of establishing a parallel alignment of the stud-to-be-welded and the previously-welded stud by receiving the previously-welded stud within a conforming opening formed in the stud contacting means.

10. The method of claim 8, comprising the step of establishing a plunge distance by:

placing a guage across and in contact with the stud contacting means and the workpiece contacting means; and causing contact between the stud-to-be-welded and the guage.

11. A front-end fixture for an electric hand-held stud welding gun of the type having a foot piece receiving a chuck of the gun and support means mounting the foot piece on the gun, the fixture being useful for welding studs to a workpiece at a predetermined stud spacing and comprising:

a foot piece in the form of a bracket means adapted to mount the bracket on the gun and having formed therein a chuck receiving opening, the chuck receiving opening being disposed at a chuck location and being specially adapted to receive a chuck;

stud contacting means disposed on said bracket for contacting a previously-welded stud by a distance corresponding to a desired stud spacing, said stud contacting means being disposed in a forward direction with respect to the chuck and comprises means for receiving a previously-welded stud about the circumference thereof;

workpiece contacting footpiece means disposed on said bracket in a rearward direction from the chuck location and extending therefrom a distance sufficient to support a rear position of the bracket above the workpiece; and workpiece contacting stop means disposed on said bracket in a forward direction from the chuck location and extending therefrom a distance sufficient to support a forward portion of the bracket above the workpiece, said stop means being fixed onto said stud contacting means.

12. A method of manually welding a stud to a workpiece at a predetermined disposition with respect to a previously-welded stud, the method comprising the steps of:

providing an electric hand-held stud welding gun having a chuck and a stud contacting means fixed with respect to the chuck at a forward location thereof;

disposing a stud-to-be-welded in the chuck;

establishing a disposition of the stud-to-be welded by contacting the previously-welded stud with the stud contacting means, by receiving the previously-welded stud within a conforming opening formed in the stud contacting means, and also contacting the workpiece with a workpiece contacting means at a location rearward from the stud-to-be welded; and welding the stud-to-be welded to the workpiece while maintaining the contact of the previously-welded stud and the stud contacting means.

* * * * *